United States Patent [19]

Cassidy

[11] Patent Number: 5,784,763
[45] Date of Patent: Jul. 28, 1998

[54] TOW LINE QUICK RELEASE HITCH

[76] Inventor: Monty S. Cassidy, P.O.Box 43, Seeley Lake, Mont. 59868

[21] Appl. No.: 862,653

[22] Filed: May 23, 1997

[51] Int. Cl.$^6$ ........................................... F16G 11/00
[52] U.S. Cl. .......................... 24/130; 24/129 R; 24/129 B
[58] Field of Search ............................... 24/130, 129 R, 24/129 B, 129 C, 129 D, 18

[56] References Cited

U.S. PATENT DOCUMENTS

| | | | |
|---|---|---|---|
| 757,820 | 4/1904 | Lykke | 24/130 |
| 890,898 | 6/1908 | Gaillac | 24/129 B |
| 2,855,133 | 10/1958 | Mullin | 24/130 |
| 3,675,276 | 7/1972 | Nuse | 24/129 B |
| 3,734,635 | 5/1973 | Sprecker | 24/130 |
| 4,939,820 | 7/1990 | Babcock | 24/129 R |
| 5,625,925 | 5/1997 | Richards | 24/129 B |

Primary Examiner—Victor N. Sakran
Attorney, Agent, or Firm—Harry M. Cross, Jr.

[57] ABSTRACT

A quick release hitch for attaching a tow line to an object comprises a flat plate body having a first opening at a first end for attachment to a connector, and a second opening at a second end through which a tow line may be inserted, a first pair of side notches, each notch of the first pair opening to one side of the body and extending transversely into the body toward the other notch of the first pair, each notch of the first pair being formed to receive the tow line, and a second pair of side notches, each notch of the second pair opening to one side of the body and extending obliquely into the body toward an opposite one of the first pair of side notches, each notch of the second pair narrowing inward and being formed to receive and secure the tow line when the tow line is inserted through the second opening and wound around the body and extended through the first pair of side notches before being extended through one of the second pair of notches.

4 Claims, 5 Drawing Sheets

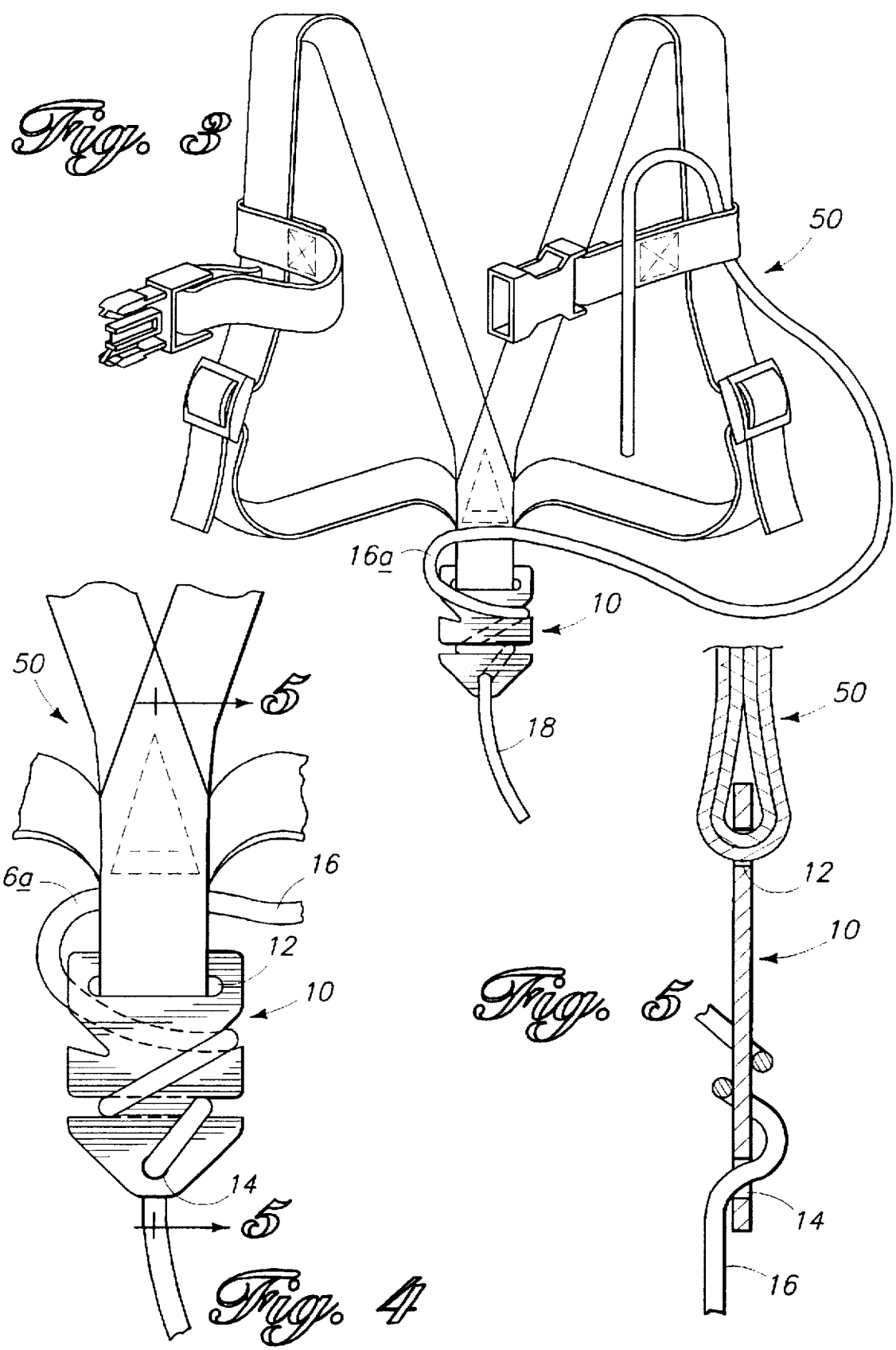

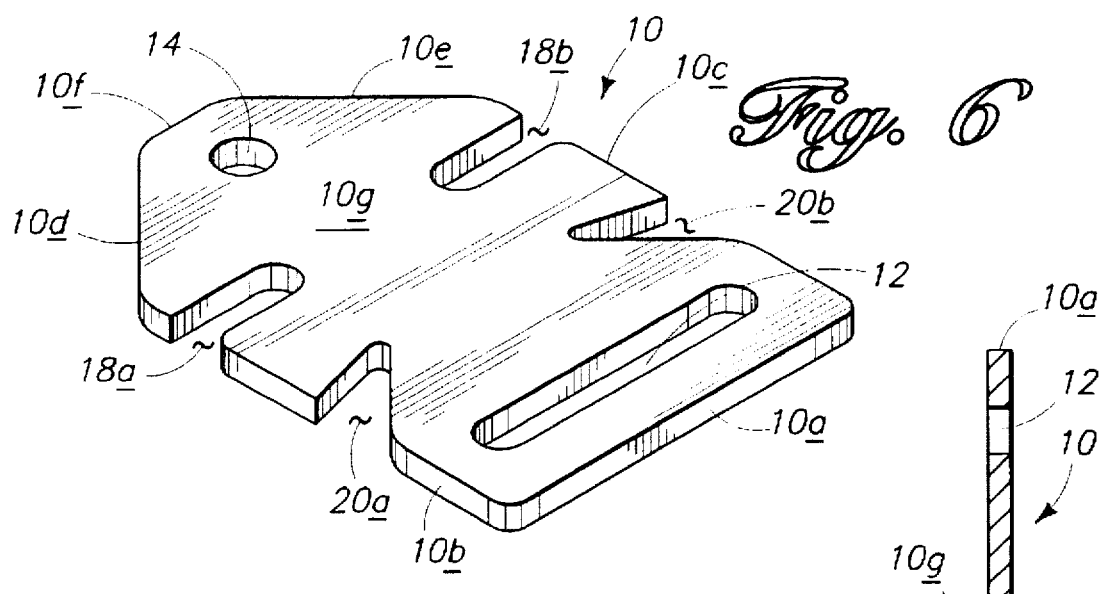
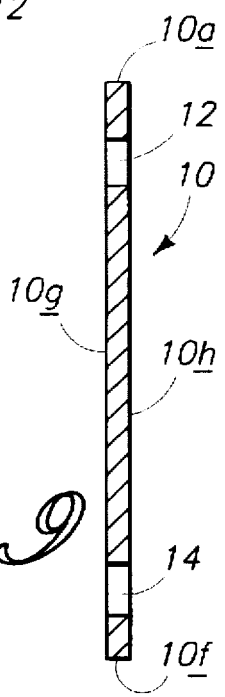
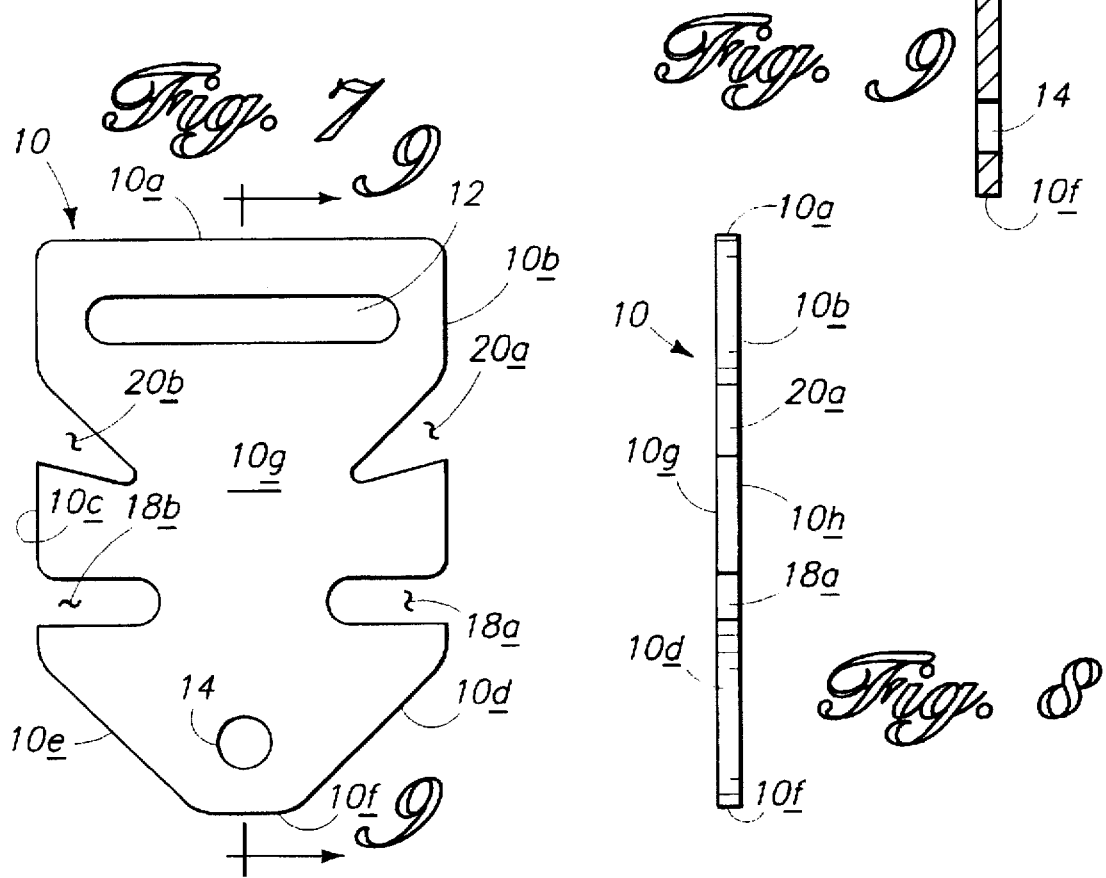

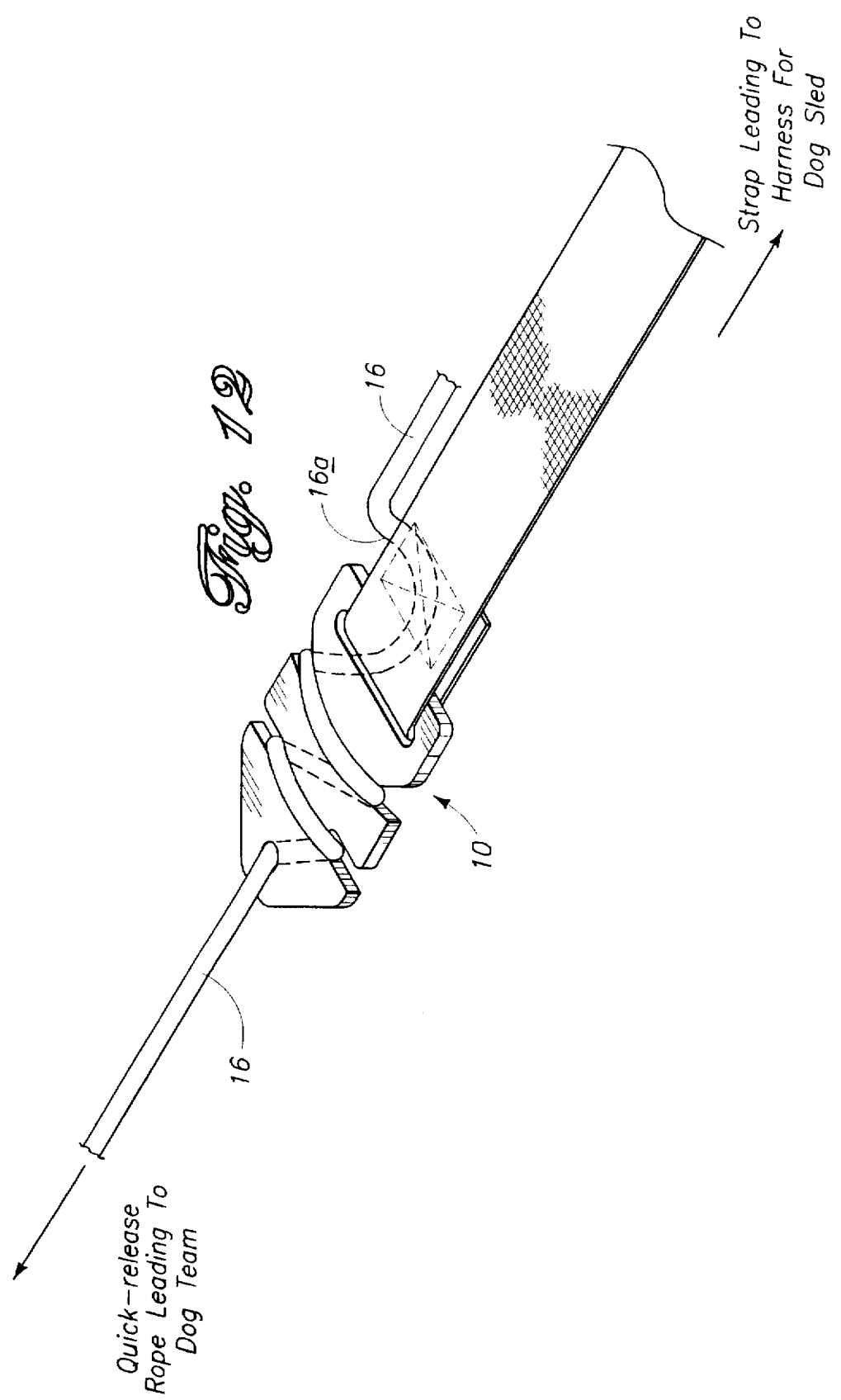

5,784,763

1

TOW LINE QUICK RELEASE HITCH

BACKGROUND OF THE INVENTION

1. Field of the Invention

This invention relates to hitches of the type designed to couple a tow line to a device in such a manner that the tow line can be quickly released from the hitch so as to disconnect the tow line from the device. The device mounting the hitch may be a harness, or some other device.

2. Brief Description of the Prior Art

There are numerous instances when a tow line is connected to some device by means of a hitch, where it is desirable to provide a means for quickly releasing the tow line from the hitch. For example, where objects to be towed are fastened to a tow line for dragging behind a person, a shoulder harness can be worn by the person and the tow line connected to the harness by means of a hitch. Where the load is to be dragged in situations where it would be desirable to be able to quickly release the load from the harness, a quick release hitch could be employed. An example of such a harness and quick release hitch arrangement is described in U.S. Pat. No. 2,855,133 to Mullin.

Other situations could also employ a quick release tow line hitch. For example, a dog sled could be attached to a dog team by means of a quick release hitch so that, where situations require, the dog team could be quickly disconnected from the hitch.

In the case of a quick release tow line hitch being used with a harness intended to be worn by a person, it would be desirable for the hitch to be fastened to the harness so that the tow line would extend from the object to be dragged to the hitch. In the case of a quick release tow line hitch being used with a dog sled, however, it would be desirable for the hitch to be fastened to the sled so that the tow line would extend from the dog team harness. In the first instance, the hitch would be desirably fastened to the harness and the tow line to the object be pulled or dragged. In the second instance, the hitch would be desirably fastened to the object being pulled or dragged and the tow line to the object doing the pulling or dragging. In some circumstances, the quick release should be attainable with a minimum of effort, even if that means that the loading capacity of the hitch is reduced. In other circumstances, it would be acceptable for the release to be attainable with slightly more effort if the loading capacity of the hitch can be enhanced.

The hitch described in the Mullin patent is relatively expensive to manufacture and it is believed this has limited its use. Furthermore, the Mullin hitch is designed for only one hitching method so that only one form of quick release is provided no matter what the loading requirements might be.

SUMMARY OF THE INVENTION

A primary object of the present invention is to provide a quick release tow line hitch that can provide the functions described above without the disadvantages of other quick release hitch designs. In particular, it is an object of the present invention to provide a quick release hitch that can be fabricated from plate material by cutting or stamping or by injection molding. Another object is to provide a quick release hitch that can be secured to a tow line in different ways so that its quick release and loading capabilities can be adjusted to varying circumstances.

These objects and advantages will become apparent from the following description of the invention.

2

In accordance with these objects and advantages, the invention comprises a quick release hitch comprising a flat plate body having a first opening at a first end for attachment to a connector, and a second opening at a second end through which a tow line may be inserted, a first pair of side notches, each notch of the first pair opening to one side of the body and extending transversely into the body toward the other notch of the first pair, each notch of the first pair being formed to receive the tow line, and a second pair of side notches, each notch of the second pair opening to one side of the body and extending obliquely into the body toward an opposite one of the first pair of side notches, each notch of the second pair narrowing inward and being formed to receive and secure the tow line when the tow line is inserted through the second opening and wound around the body and extended through the first pair of side notches before being extended through one of the second pair of notches.

BRIEF DESCRIPTION OF THE DRAWINGS

FIG. 3 is a perspective view of the FIG. 1 harness with the quick release hitch and tow line shown as they would appear looking from front to back;

FIG. 4 is an enlarged detail view of the quick release hitch from the perspective shown in FIG. 1;

FIG. 5 is a cross-section view taken along the line 5—5 in FIG. 4;

FIG. 6 is a perspective view of the quick release hitch, by itself;

FIG. 7 is a plan view of the FIG. 6 hitch;

FIG. 8 is a side view of the FIG. 6. hitch;

FIG. 9 is a cross-section taken along the line 9—9 in FIG. 7;

FIG. 12 is perspective view of the hitch applied to a strap and to a tow line for connecting a dog team to a dog sled.

DESCRIPTION OF THE PREFERRED EMBODIMENT

Figure 1:
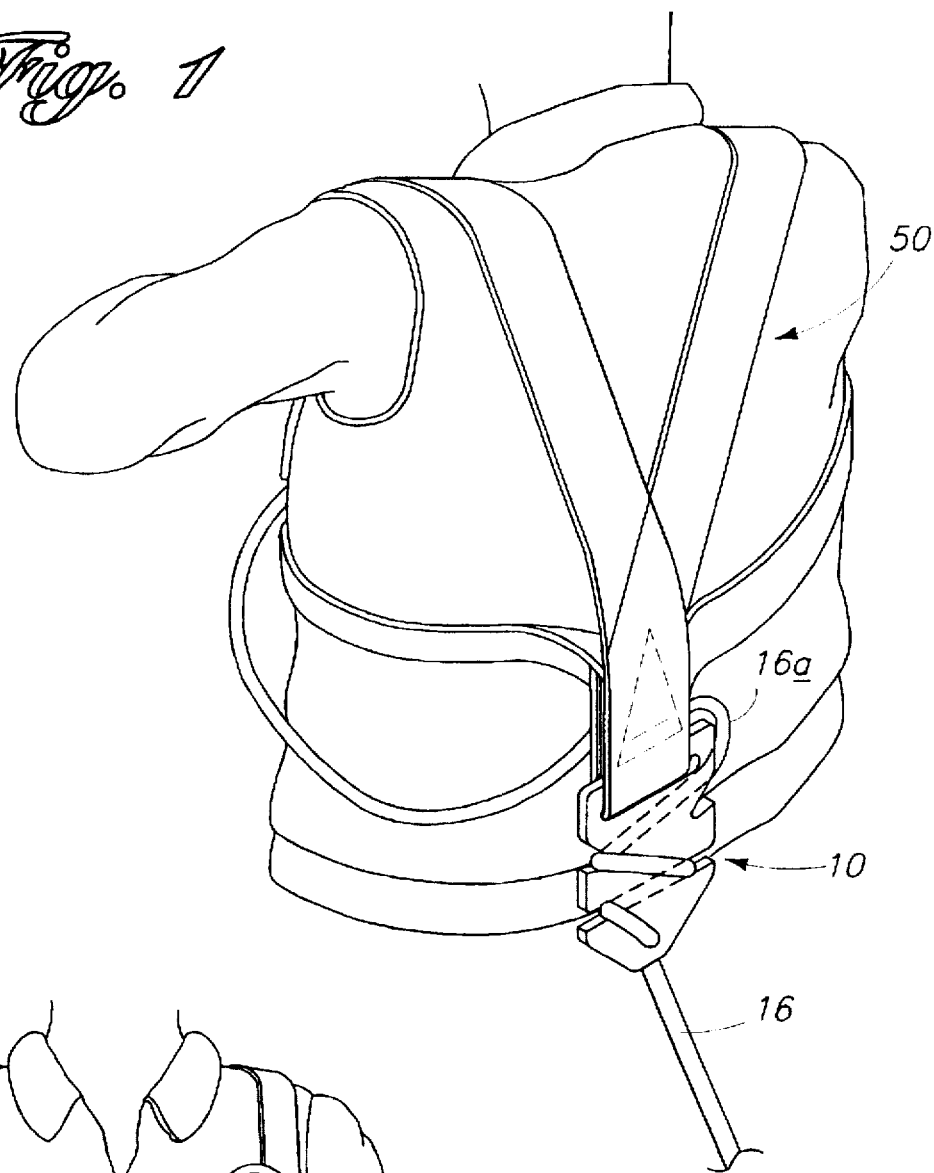
FIG. 1 is a perspective view illustrating the quick release tow line hitch of this invention connected to a shoulder harness designed to be worn by a person to pull an object attached to a tow line.
Figure 2:
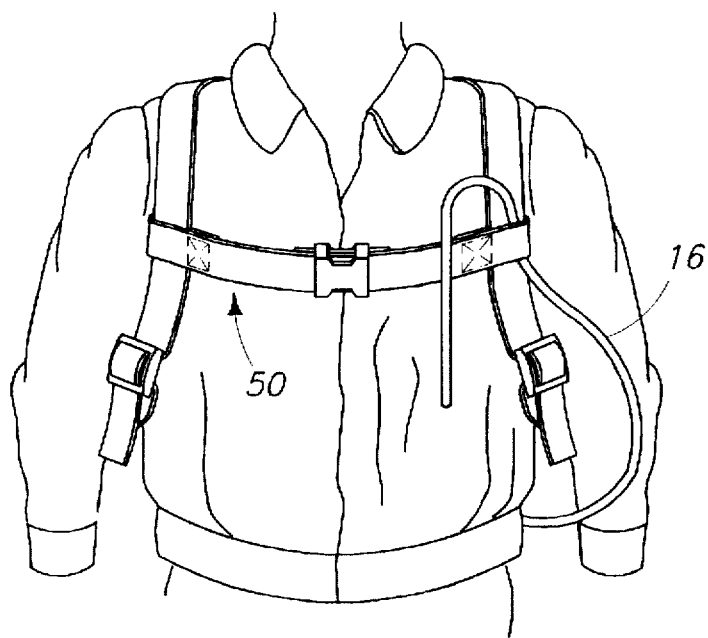
FIG. 2 is a partial front elevation view of a person wearing the FIG. 1 shoulder harness.

Referring initially to FIGS. 6–11, the quick release hitch of this invention comprises a flat plate body 10 having a length greater than its width that is generally rectangular. One end, 10a, is formed perpendicular to the two parallel sides, 10b, 10c, and provides a straight segment that extends across between the sides. The other end is formed as a truncated triangle having oblique segments 10d, 10e that converge to a straight segment 10f. The first end, represented by segment 10a, is provided with a transverse elongated aperture 12 for attachment to a belt or strap-like connector. The second end, represented by segments 10d, 10e and 10f, is provided with an arcuate aperture 14 through which a tow line 16 may be extended. The arcuate aperture 14 may be circular or oblong or of some other suitable configuration so long as the upper end of the aperture has a rounded configuration so as 10 to not chafe the tow line segment that extends through the aperture. The hitch body plate is of a uniform thickness, providing two parallel faces 10g, 10h that are flat.

The hitch body is somewhat elongated, as shown, to provide space for two sets of side notches. One set of side notches is located adjacent the second end of the hitch and comprises left and right notches 18a, 18b that each open at one of the hitch sides, 10b and 10c respectively, and extend toward one another, perpendicular to the longitudinal axis of the hitch as shown particularly in FIG. 7. The bases of the notches 18a and 18b are semicircular. A second set of side notches is located adjacent the first end of the hitch and comprises left and right notches 20a, 20b that each open at one of the hitch sides, 10b, 10c respectively, and extend obliquely generally toward the center of the hitch. Whereas the two sides of each of the notches of the first set of notches, 18a and 18b, are straight and parallel to one another, as shown in FIG. 7, the sides of each of the notches of the second set of notches, 20a and 20b, converge toward one another in straight lines and terminate at their intersection— each point of intersection preferably being rounded to relieve stress in the body of the hitch. Each of the convergent notches 20a, 20b are oriented to point generally toward the base of the opposite notch, 18a or 18b, of the first set of notches; notch 20a pointed toward the base of notch 18b, and notch 20b pointed toward the base of notch 18a. In the plan view of FIG. 7, the notches 18a and 18b of the first set of notches appear U-shaped, and the notches 20a and 20b of the second set of notches appear V-shaped or wedge-shaped. Because the second set of notches 20a and 20b are obliquely oriented with respect to the hitch body's longitudinal axis, one side of each notch is longer than the other; the sides nearest the first end 10a being the longer and the sides nearest the second end being the shorter such that the longer side intersects the hitch body side at an obtuse angle and such that the shorter side intersects the hitch body at an acute angle.

Figure 10:
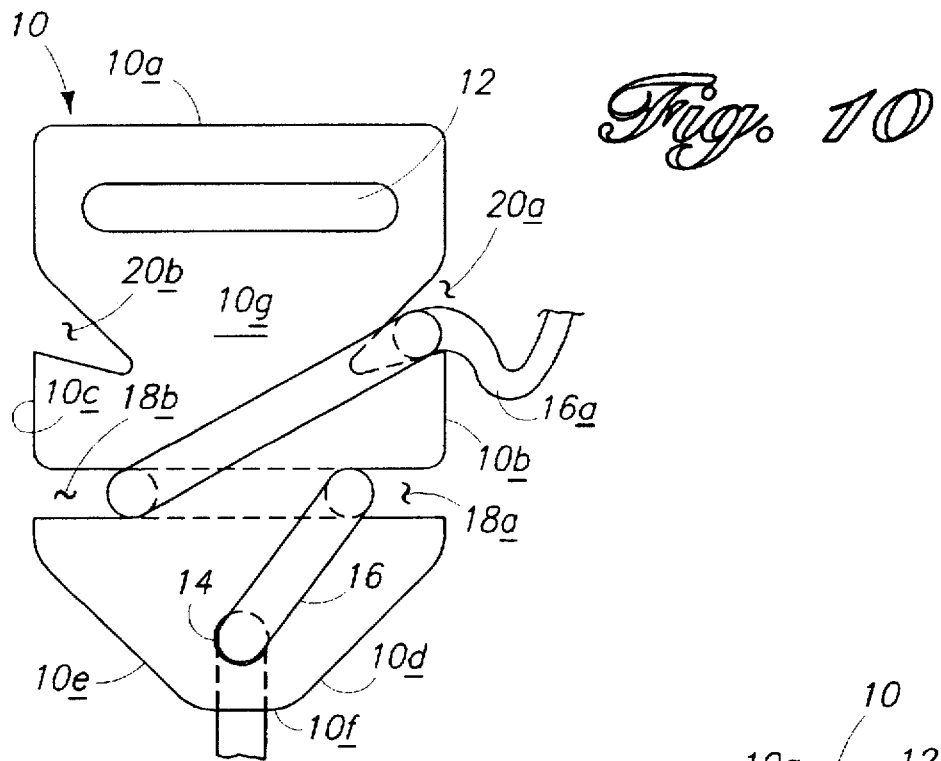
FIG. 10 is a plan view of the FIG. 6 hitch with a tow line applied to the hitch in a first version.
Figure 11:
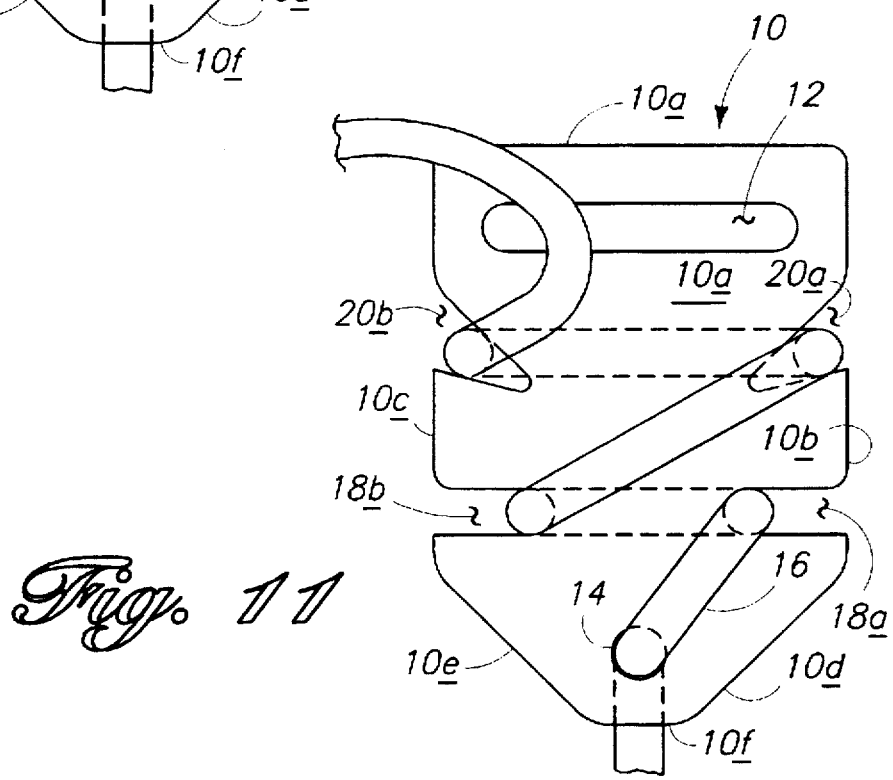
FIG. 11 is a plane view of the FIG. 6 hitch with a tow line applied to the hitch in a second version.

The configuration of the hitch body, and its two set of notches, is designed so that the tow line 16 can be extended through the arcuate aperture 14, across one of the body faces (such as face 10g in FIG. 10) and through one of the first set of notches (such as 18a in FIG. 10), across the other face and through the opposite notch of the first set (such as 18b in FIG. 10), and across the first face (i.e. 10g) and through one of the notches of the second set (such as 20a in FIG. 10). The tow line passes through the arcuate aperture 14 relatively unencumbered inasmuch as the aperture 14 would preferably have a size slightly larger than the diameter of the tow line. The tow line also passes through the U-shaped notches 18a, 18b relatively unencumbered inasmuch as these notches would preferably have a width approximately the same as the diameter of the tow line. The segment of the tow line 16 that passes through the V-shaped, or wedge-shaped, notch is forced or wedged into the notch toward its inner end so as to be fastened by friction in that notch. The opening into each of the convergent notches is larger than the diameter of the tow line so that the tow line can be easily inserted into one or both convergent notches, as desired. The segment of the tow line 16 that extends beyond the V-shaped notch is left as a bight, that is as a loose segment, such as shown at 16a in FIG. 10 so that the tow line will remain locked into the V-shaped notch. When it is desired to release the tow line from the hitch body, the bight may be jerked so as to pull the tow line toward the open end of the V-shaped notch and out of the V-shaped notch, thereby releasing the tow line from being locked in the V-shaped notch. Once released from the V-shaped notch, the tow line can be freely pulled out through the arcuate aperture 14 and disengaged from the hitch body.

The tow line application to the hitch body shown in FIG. 10 has the desirable feature that a simple jerk, or forceful pull, on the bight end of the tow line will free the tow line so that it can be freely pulled from the hitch body. This is an important feature if the hitch is applied to a shoulder harness designed to be worn by a person, such as shown in FIGS. 1–5. Where a person, wearing the shoulder harness 50, is pulling or dragging a load, such as a game animal or some other relatively heavy object, an occasion may come up where the person must disengage himself or herself from the load quickly. The FIG. 10 arrangement of the tow line, also shown in FIGS. 1 and 3–5, enables such a rapid and quick release following a simple jerk on the bight end of the tow line, the jerk needing only to be sufficient to straighten the bight out and pull the tow line out of the V-shaped notch.

In other situations, where the tow line and hitch are not connected to a person in some way, a stronger connection between the tow line and the hitch body may be desired. For example, as shown in FIG. 12 the hitch body 10 and tow line 16 may be connected between a dog sled and a dog team. In this arrangement, and as shown in more detail in FIG. 11, the tow line 16 may be extended from the notch 20a, across the face 10b of the hitch body and into notch 20b. Consequently, two segments of the tow line are wedged into convergent notches (notches 20a and 20b) to enhance the secure wedging of the tow line into the hitch body. By extending the tow line through both convergent notches 20a and 20b, the likelihood that the tow line might be inadvertently dislodged from a binding connection with the hitch body is substantially reduced. In the configuration shown in FIG. 1, for example, even though the tow line 16 is inserted between the person wearing the harness 50 and the hitch body 10 so as to form the loose loop or bight 16a, the bight might be inadvertently dislodged to an extent that would cause the tow line to be removed from the wedged condition within convergent notch 18a. The configuration shown in FIGS. 11 and 12 would prevent that from happening. Moreover, the configuration shown in FIGS. 11 and 12 might enable the tow line to hold a greater force or load than the FIGS. 1 and 10 arrangement because of the tow line being wedged into both convergent notches. However, the FIGS. 11 and 12 arrangement requires two jerks, or one substantially longer and harder jerk, on the tow line to free the tow line from the two convergent notches. Consequently, the FIGS. 11 and 12 arrangement may not be quite as quick releasing as the FIGS. 1 and 10 arrangement. The provision of two sets of notches, configured as shown in FIGS. 6–9, enables the user to fashion the way the tow line is wrapped around the hitch body to suit the conditions, either those of the type encountered with the FIGS. 1–5 arrangement or those of the type encountered with the FIG. 12 arrangement. Where the hitch body is behind the user, as in the FIG. 1 arrangement, securing the tow line in only one of the convergent notches permits a sure and quick release. Where the hitch body can be accessed in front of the user, as when the user is not connected to the hitch body—as shown in FIG. 12 for example, the user could find it convenient to quickly jerk the tow line free from both convergent notches without any difficulty.

Because the notches 20a and 20b of the second set of notches converge obliquely toward notches 18a and 18b of the second set in the manner shown in FIG. 7, a force pulling on the tow line segment that enters the arcuate aperture 14 across hitch body segment 10f will cause the wedged tow line segment to be pulled further into the convergent notch (such as 20a in FIG. 10) thereby even more securely binding the tow line into that convergent notch. The same would be true of the FIG. 11 tow line wrapping arrangement also. It is, therefore, essential to the satisfactory functioning of the hitch body that the two convergent notches 20a and 20b be obliquely oriented so that they point to their respectively opposite U-shaped notches (i.e. 18b and 18a, respectively). It is the combination of the two transverse notches 18a and 18b with the convergent oblique notches 20a and 20b that provide the enhanced utility of the hitch body.

A suitable hitch body for use with a shoulder harness would be about 2 inches wide×3 inches long, and ⅛–⅜ inch thick. It could be fabricated from steel, aluminum or a hard plastics material. For use with a ¼ inch tow line, aperture 14 could by 5/16–⅝ inches in diameter, notches 18a and 18b could be 5/16–⅝ inches wide and ½–⅝ inches deep, notches 20a and 20b could have an opening ⅜–½ inch wide narrowing to a base width of about ⅛ inch and be about ⅝ inch deep.

A major advantage of the hitch body is that the tow line 16 may be inserted through the aperture 14 from either side of the body. This is so because the body notches 18a, 18b and 20a, 20b will accept the tow line from either side of the body. For some applications, the tow line should be inserted through the aperture 14 in a particular direction, relative to the object to which the hitch is connected, to place the tow line bight 16a in a particular position. This can be accomplished easily with the present invention.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A quick release hitch assembly comprising a tow line means having a free tow line end and a flat plate body means, said body means having:

(a) a first opening at a first end for attachment to a connector, and a second opening at a second end through which said tow line is insertable;

(b) a first pair of side notches adjacent to said second opening, each notch of said first pair opening to one side of said body means and extending transversely into said body means toward the other notch of said first pair generally perpendicular to a longitudinal axis of said body means, each notch of said first pair being formed to receive the tow line means;

(c) and a second pair of side notches adjacent to said first opening, each notch of said second pair opening to one side of said body means and extending obliquely into said body means toward an opposite one of said first pair of side notches, each notch of said second pair narrowing inward and being formed to receive and secure the tow line means when the tow line means is inserted through said second opening and wound around said body means and extended through said first pair of side notches before being extended through one of said second pair of notches said tow line end extending sequentially though said second opening, through one of the notches of said first pair, transversely around said body means and through the other notch of said first pair, obliquely across said body means and through at least one notch of said second pair when said hitch assembly is attached to a load whereby, when said hitch assembly is under load, said tow line means is quickly released from said body means when said tow line end is pulled free of the notches of said second pair and allowed to freely run sequentially through the notches of said first pair and out through said second opening.

2. The hitch of claim 1 wherein the side notches of said first pair are each formed with semicircular ends and parallel sides; and wherein the side notches of said second pair are formed with converging sides.

3. The hitch of claim 1 wherein said first opening is elongated transversely across said body; and wherein said second opening has an arcuate inner end.

4. The hitch of claim 1 wherein the side notches of said first pair are each formed with semicircular ends and parallel sides; wherein the side notches of said second pair are formed with converging sides; wherein said first opening is elongated transversely across said body; and wherein said second opening has an arcuate inner end.

* * * * *